(No Model.)
A. J. PHILLIPS.
SNOW SCRAPER.
No. 323,730. Patented Aug. 4, 1885.
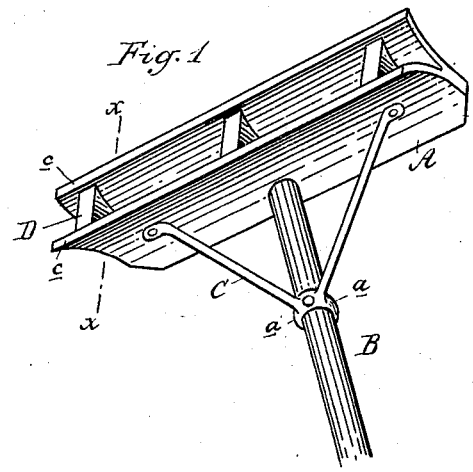
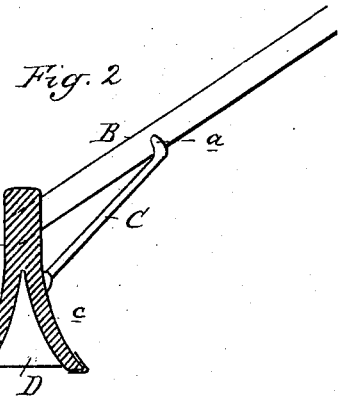
Attest:
A. Barthel
Inventor:
A. J. Phillips
by his Atty Thos. S. Sprague

UNITED STATES PATENT OFFICE.

ANDREW J. PHILLIPS, OF FENTONVILLE, MICHIGAN.

SNOW-SCRAPER.

SPECIFICATION forming part of Letters Patent No. 323,730, dated August 4, 1885.

Application filed January 2, 1885. (No model.)

*To all whom it may concern:*

Be it known that I, ANDREW J. PHILLIPS, of Fentonville, in the county of Genesee and State of Michigan, have invented new and useful Improvements in Snow-Scrapers; and I do hereby declare that the following is a full, clear, and exact description thereof, reference being had to the accompanying drawings, which form a part of this specification.

This invention relates to certain new and novel improvements in the construction of snow-scrapers, the object of the invention being to provide a scraper with two scraping-edges, in order that the device may be used effectively in either drawing toward or pushing from the operator.

The invention consists in the peculiar construction of the scraper, all as more fully hereinafter set forth.

Figure 1 is a perspective view of my improved scraper. Fig. 2 is a cross section through the head on the line $x$ $x$, Fig. 1.

In the accompanying drawings, which form a part of this specification, A represents the head of my scraper, which is provided with the handle B. To give rigidity to the parts I secure to the head the ends of a V-shaped brace, C, the bend of which is provided with two arms or studs, $a$, between which the handle rests, and is secured in place by a proper screw. The lower edge of the head I split or bifurcate longitudinally, forming the two wings $c$, between which I rigidly secure the wedge-shaped spreader-blocks D.

If desired, the two edges of these wings $c$ may be faced or bound with iron, where the head is made of wood; or the head may be made of two plates of sheet metal properly bolted together without departing from the spirit of my invention.

By this construction I provide a head for scrapers that has two scraping-edges, that can be advantageously used in pushing or pulling, and that is much stronger than those designed for a similar use where made of one board with but one pushing edge.

What I claim as my invention is—

1. A head for snow-scrapers, consisting of the head A, provided with the wings $c$, braced apart in any suitable manner, substantially as and for the purposes described.

2. In combination with the head A, provided with the wings $c$, the wedge-blocks D, substantially as set forth.

3. A snow-scraper consisting of the head A, provided with the wings $c$, wedge-blocks D, and handle B, when constructed, arranged, and operating substantially in the manner and for the purposes specified.

ANDREW J. PHILLIPS.

Witnesses:
H. S. SPRAGUE,
E. SCULLY.